L. DÜRR.
EYELET.
APPLICATION FILED JUNE 28, 1920.

1,410,900.

Patented Mar. 28, 1922.

Inventor:

Ludwig Dürr

UNITED STATES PATENT OFFICE.

LUDWIG DÜRR, OF FRIEDRICHSHAFEN, GERMANY, ASSIGNOR TO THE FIRM LUFT-SCHIFFBAU ZEPPELIN GESELLSCHAFT MIT BESCHRANKTER HAFTUNG, OF FRIEDRICHSHAFEN, GERMANY.

EYELET.

1,410,900.  Specification of Letters Patent.  Patented Mar. 28, 1922.

Application filed June 28, 1920. Serial No. 392,538.

(GRANTED UNDER THE PROVISIONS OF THE ACT OF MARCH 3, 1921, 41 STAT. L., 1313.)

*To all whom it may concern:*

Be it known that I, LUDWIG DÜRR, a citizen of the German Empire, residing at Friedrichshafen, Germany, have invented certain new and useful Improvements in Eyelets, (for which I have filed application in Germany May 16, 1914, Patent No. 293,017) of which the following is a specification.

The customary manner of attaching stay wires to sheet metal is by an eyelet being stamped out in the sheet metal, and the wires, after they have been secured against rupture by means of thimbles being drawn through said eyelets. However, in the case of weak sheet metal plates, a reinforcement of this kind by means of eyelets arranged at the tightening points will prove inadequate, since, on the load being increased, the eyelets are liable to be torn out of the metal. In the event of the tension member being merely run or slipped through the eyelets, that is to say when it is not reinforced by thimbles, the provision of simple eyelets will involve the additional disadvantage that the eyelet offers but a very slight support for the wire, so that the wire comes to be sharply bent in consequence, and the danger of its snapping or breaking is increased.

My present invention purposes to obviate these drawbacks by the sheet metal being reinforced by means of flanged or bulged sheet metal plates fixed to both sides of the place subject to tension, the said flanged plates acting as abutments for the flanged link.

Figure 1:
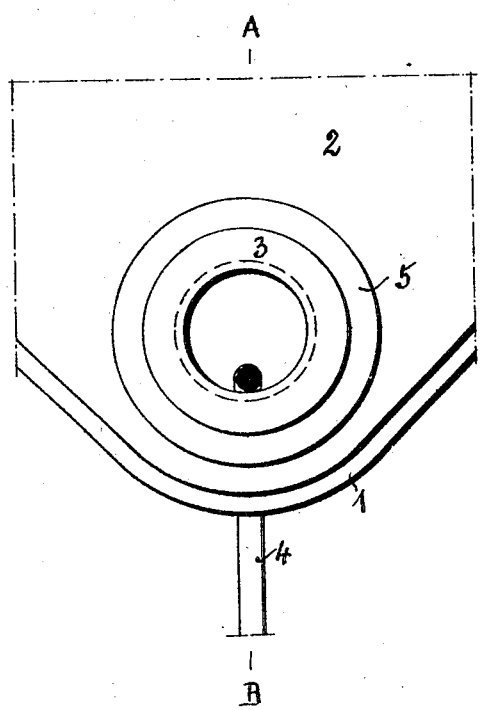
Figure 2:
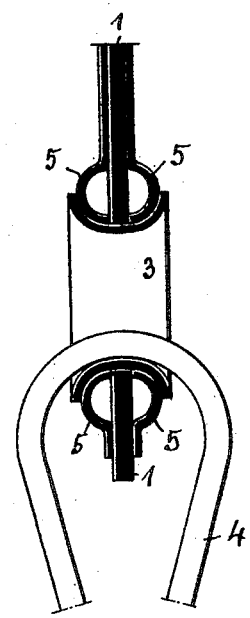

A structure embodying the subject matter of my invention is shown by way of example in the accompanying drawing, affixed to this specification and forming part thereof, in which Fig. 1 is a view of the place subject to tension, and Fig. 2 a section on line A—B in Fig. 1.

As shown in the drawing, there are arranged on the metal sheet and this to either side of the place subject to tension, sheet metal plates 2, which are flanged or bulged at 5 right around the bore hole formed in the sheet metal member 1. Hereupon, an eye 3 is fitted into the bore hole, and beaded on either side, so that it will come to repose completely on the flanged or bulged portions 5 formed on the sheet metal plates 2, and will thus be enabled to offer a large supporting face for the wire 4 run through the eye.

The use of thimbles may thus be entirely dispensed with, while the provision of the flanged members increases the strength of the whole structure.

I claim:

In an eyelet for sheet metal connection in combination, flanged perforated sheet metal plates disposed on both sides of the metal sheet and surrounding the perforation thereof and an eye, beaded on either side, inserted in said perforation so as to rest on and embrace said flanges.

In testimony whereof I affix my signature.

DR. LUDWIG DÜRR.